United States Patent
Teggatz et al.

(10) Patent No.: US 7,071,664 B1
(45) Date of Patent: Jul. 4, 2006

(54) PROGRAMMABLE VOLTAGE REGULATOR CONFIGURABLE FOR DOUBLE POWER DENSITY AND REVERSE BLOCKING

(75) Inventors: Ross E. Teggatz, McKinney, TX (US); Sanmukh M. Patel, Richardson, TX (US); Rex M. Teggatz, Sachse, TX (US); Suribhotla V. Rajasekhar, Plano, TX (US); Valerian Mayega, Irving, TX (US)

(73) Assignee: Texas Instruments Incorporated, Dallas, TX (US)

( * ) Notice: Subject to any disclaimer, the term of this patent is extended or adjusted under 35 U.S.C. 154(b) by 59 days.

(21) Appl. No.: 11/017,177

(22) Filed: Dec. 20, 2004

(51) Int. Cl.
 *G05F 1/44* (2006.01)
(52) U.S. Cl. .................. 323/280; 323/273; 323/285
(58) Field of Classification Search ........ 323/282–288, 323/220, 224, 280, 273, 266, 268; 363/20, 363/97, 131, 65
See application file for complete search history.

(56) References Cited

U.S. PATENT DOCUMENTS

| | | | | |
|---|---|---|---|---|
| 5,004,970 | A | * | 4/1991 | Barou .......................... 323/277 |
| RE34,159 | E | * | 1/1993 | Harrington et al. ............ 361/31 |
| 5,677,558 | A | * | 10/1997 | McGlinchey ................ 257/370 |
| 5,929,617 | A | * | 7/1999 | Brokaw ....................... 323/280 |
| 6,184,744 | B1 | * | 2/2001 | Morishita ..................... 327/541 |
| 6,476,589 | B1 | * | 11/2002 | Umminger et al. .......... 323/282 |
| 6,909,320 | B1 | * | 6/2005 | Chan et al. .................. 327/541 |

\* cited by examiner

*Primary Examiner*—Rajnikant B. Patel
(74) *Attorney, Agent, or Firm*—William B Kempler; W. James Brady, III; Frederick J. Telecky, Jr.

(57) ABSTRACT

A programmable voltage regulator configurable for reverse blocking and double power density is disclosed herein. The programmable voltage regulator includes an error amplifier that couples to receive a reference voltage. A first NMOS pass transistor connects between an auxiliary voltage input node and the output terminal of the voltage regulator, wherein the first NMOS pass transistor is biased by the output of the error amplifier. Connected between the source of the first NMOS pass transistor and the second input of the error amplifier, a feedback network provides feedback for the voltage regulator. A second NMOS pass transistor connects between the first power supply and the auxiliary voltage input node. Furthermore, an independent node control circuit biases the second NMOS pass transistor such that in a first mode of operation, a first control signal input is operable to receive a signal for controlling the second NMOS pass transistor during reverse battery condition. In a second mode of operation, independent node control circuit includes a second control signal input that is operable to couple to the output terminal of the error amplifier while simultaneously the first power supply rail is operable to couple to the output terminal of the voltage regulator to provide double power density.

5 Claims, 3 Drawing Sheets

PROGRAMMABLE VOLTAGE REGULATOR CONFIGURABLE FOR DOUBLE POWER DENSITY AND REVERSE BLOCKING

FIELD OF THE INVENTION

The present invention relates to pre-regulators and, more particularly, a programmable voltage pre-regulator configurable for double power density and reverse blocking.

BACKGROUND OF THE INVENTION

Power management control systems including voltage regulators are incorporated within electronic devices to generate a stable output voltage from a varying input voltage supply. The purpose of the voltage regulator is to regulate the external power supplied to the internal circuitry such that the current usage or quiescent power is efficient. The efficiency of battery powered supply systems is directly related to the amount of power dissipated in the voltage regulator.

A particular type of voltage regulator, the low drop out (LDO) linear voltage regulator is used to reduce power consumption by providing the lowest voltage drop across the linear regulator. The lowest voltage drop the regulator can tolerate before loss of regulation occurs is called the "drop-out" voltage. As shown in FIG. 1, a linear voltage regulator 10 conventionally includes an amplifier 14 which compares the output of a voltage reference 12 to a sample of an output voltage supplied by feedback elements 24. The output of the amplifier 14 is coupled to a control terminal 16 of a pass element 18 which serves to "pass" current from the unregulated input terminal 20 of the voltage regulator 10, to the regulated output terminal 22 of the voltage regulator 10. The feedback control loop 26 formed by the amplifier 14, pass element 18 and feedback elements 24 acts to force the control terminal 16 of the pass element 18 to a dynamic value that maintains a regulated voltage at the output terminal 22 of the voltage regulator 10.

More specifically, a conventional LDO linear voltage regulator includes a power PMOS pass transistor which substitutes for pass element 18 and a voltage substituting for feedback element 24. An input voltage $V_{in}$ is applied to the conduction terminal of the PMOS transistor. A parasitic resistance may be serially connected to output capacitance 28. In addition, an optional by-pass capacitance may be connected in parallel to the series RC connection including the output capacitance and the parasitic resistance.

Operation of all integrated circuits (ICs) depends upon a power supply having a potential difference for use in powering internal integrated circuit components to ensure their operation. It is common for the power supply battery to be inadvertently reversed, thereby reversing the bias of the applied potential difference. In the automotive industry, for example, during a jump start, a battery may be mistakenly connected backwards to a circuit wherein the negative supply connects to the positive power rail and the positive supply connects to the negative power rail. As a result, severe damage to integrated circuits connected to the power supply occurs without any form of reverse bias protection between the integrated circuit and the applied potential difference. Moreover, this extreme condition of reverse battery can cause excessive power consumption.

Specifically, many regulators include NMOS devices having intrinsic backgate diodes. When the reverse battery condition occurs, a substantial amount of current will go through the backgate diode and a large amount of power will be dissipated through this device in the regulator.

There, however, are numerous ways that reverse bias protection may be implemented within an integrated circuit design and more particularly within a voltage regulator. Common reverse bias protection circuitry may include current-limiting resistors, diodes or MOS-transistors in series with a big pass transistor.

In many applications where high voltages must be regulated or otherwise controlled in some manner, the circuitry for controlling the high voltages must be constructed to withstand high voltages. The expense, however, of components having high break-down voltages is greater than that of components with lower break-down voltages. In addition, the design that includes high break-down voltage components lack high voltage isolation which is a disadvantage. Thus, there is an advantage in utilizing low break-down voltage components.

Voltage regulators that are designed with low breakdown voltage components, however, cannot be used in high-voltage applications, such as applications that include automotive regulators having a 40 volt power supply.

Although there are many regulators on the market which are operable at a high voltage and provide high precision, there are none that provide an optional mode that includes reverse battery protection.

Thus, there is a need for a low drop-out voltage regulator that may be configurable to provide reverse battery protection circuit and to provide double power density. Moreover, this low drop-out voltage regulator must be operational in high voltage applications.

The present invention is directed to overcoming, or at least reducing the effects of one or more of the problems set forth above.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

To address the above-discussed deficiencies of voltage regulators, the present invention teaches a programmable voltage regulator that satisfies both the reverse battery protection condition and optionally, provides double power density. This programmable voltage regulator includes an error amplifier that couples to receive a reference voltage. A first NMOS pass transistor connects between an auxiliary voltage input node and the output terminal of the voltage regulator, wherein the first NMOS pass transistor is biased by the output of the error amplifier. A second NMOS pass transistor connects between the first power supply and the auxiliary voltage input node. An control circuit biases the second NMOS pass transistor such that in a first mode of operation, a first control signal input is operable to receive an independent control signal for controlling the second NMOS pass transistor during reverse battery condition. In a second mode of operation, the control circuit includes a second control signal input that is operable to couple to the output terminal of the error amplifier while simultaneously the first power supply rail is operable to couple to the output terminal of the voltage regulator to provide double power density.

Included also within the programmable voltage regulator in accordance with the present invention, a feedback network connects between the source of the first NMOS pass transistor and the second input of the error amplifier. In addition, a voltage supervisor circuit having a reset delay connects to the output terminal of the voltage regulator, such that the voltage supervisor circuit is effective to render the voltage regulator non-operational in the event of the voltage supplied by the first NMOS pass transistor falling below a predetermined level. A third NMOS pass transistor, biased by the voltage supervisor, connects between a reset node and the second power supply rail.

The advantages of this voltage regulator includes but is not limited to a voltage regulator having two modes of operation, wherein in one mode of operation, the voltage regulator is configurable to provide reverse battery protection and in a second mode of operation, the voltage regulator is configurable to provide double power density. This voltage regulator, when implemented as a preregulator, provides high-voltage isolation to any regulator connected thereto. Moreover, when the voltage regulator is implemented as a preregulator, it may be connected to regulators that include low breakdown components. The reset node of the voltage regulator provides a means for an integrated self-turning enable output that can turn on a regulator and other modules when a predetermined voltage level is sustained.

The following description and annexed drawings set forth in detail certain illustrative aspects and implementations of the invention. These are indicative of but a few of the various ways in which the principles of the invention may be employed.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF PREFERRED EMBODIMENTS

Figure 1:
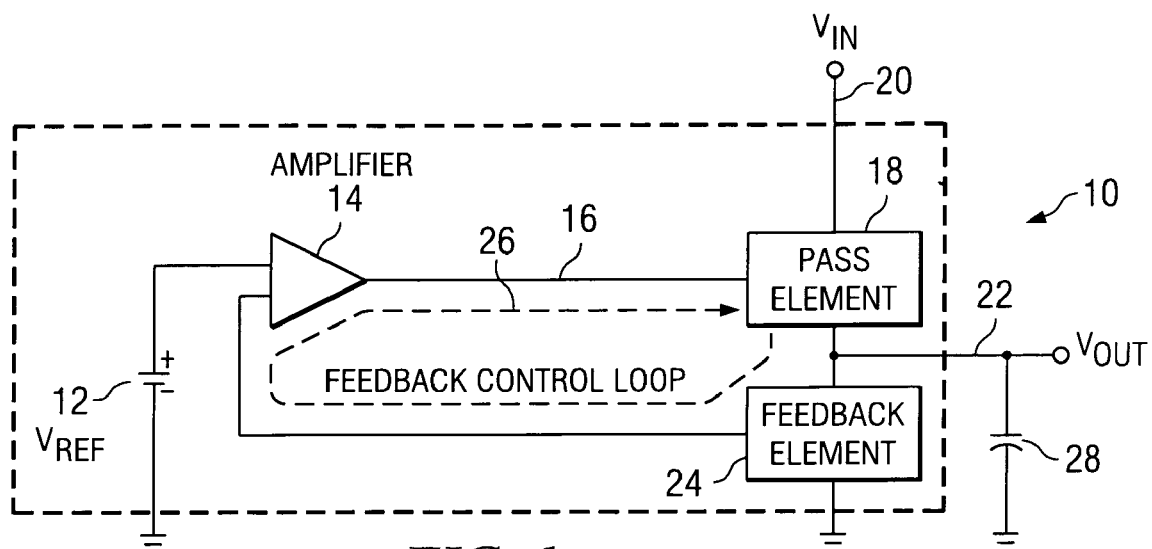
FIG. 1 is a known low drop-out linear voltage regulator.

One or more exemplary implementations of the present invention will now be described with reference to the attached drawings, wherein like reference numerals are used to refer to like elements throughout. The various aspects of the invention are illustrated below in a voltage regulator, although the invention and the appended claims are not limited to the illustrated examples.

Figure 2:
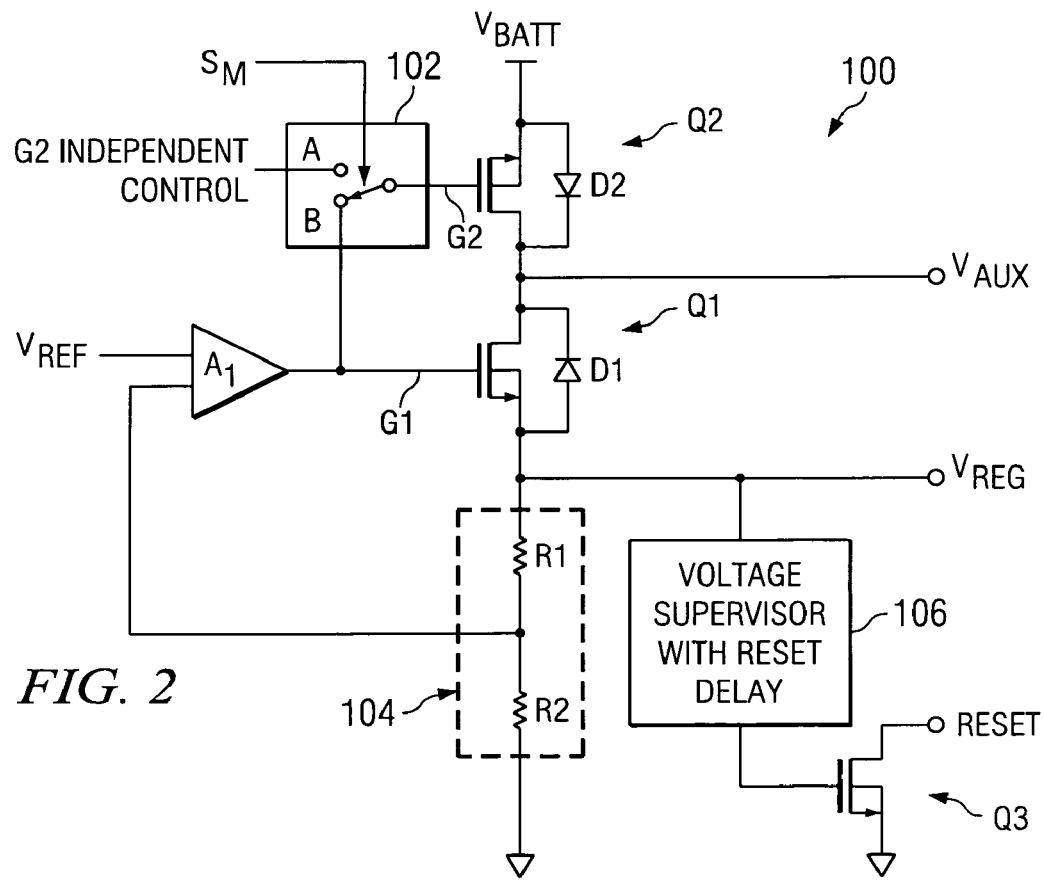
FIG. 2 illustrates the novel voltage regulator in accordance with the present invention.

FIG. 2 illustrates the programmable voltage regulator in accordance with the present invention that includes both a reverse battery protection feature and a double power density feature. Programmable voltage regulator 100 includes an error amplifier $A_1$ that couples to receive a reference voltage $V_{ref}$. A first NMOS pass transistor $Q_1$ connects between an auxiliary voltage input node $V_{aux}$ and the output terminal of the voltage regulator $V_{reg}$, wherein the first NMOS pass transistor $Q_1$ is biased by the output of the error amplifier $A_1$. A second NMOS pass transistor $Q_2$ connects between the first power supply $V_{batt}$ and the auxiliary voltage input node $V_{aux}$. An control circuit 102 biases the second NMOS pass transistor $Q_2$ such that in a first mode of operation, a first control signal input A is operable to receive an independent node control signal for controlling the second NMOS pass transistor $Q_2$ during reverse battery condition. In a second mode of operation, control circuit 102 includes a second control signal input that is operable to couple to the output terminal of the error amplifier $A_1$ while simultaneously the first power supply rail $V_{batt}$ is operable to couple to the output terminal of the voltage regulator $V_{reg}$ to provide double power density.

A feedback network 104 connects between the source of the first NMOS pass transistor $Q_1$ and the second input of the error amplifier $A_1$. In addition, a voltage supervisor circuit 106 having a reset delay connects to the output terminal of the voltage regulator $V_{reg}$, such that the voltage supervisor circuit is effective to render the voltage regulator 100 non-operational in the event of the voltage supplied by the first NMOS pass transistor $Q_1$ falling below a predetermined level. A third NMOS pass transistor $Q_3$, biased by the voltage supervisor 106, connects between a reset node RESET and the second power supply rail GND.

The voltage supervisor circuit 106 having reset delay enables transistor $Q_3$ to provide a reset signal to circuits connected downstream when the voltage at the output terminal $V_{Reg}$ of the voltage regulator 100 drops below a preset voltage that is set by the voltage supervisor circuit 106. Specifically, when the voltage regulator output $V_{Reg}$ reaches a preset voltage as monitored by voltage supervisor circuit 106, transistor $Q_3$ shuts 'off'. As a result, a pull up occurs on the reset pin RESET which pulls the reset pin RESET high. Thereby, circuits that are connected to the reset pin RESET are enabled. The reset pin RESET changes the impedance of transistor $Q_3$ from high impedance to low impedance when the reset pin RESET is enabled.

Figure 3:
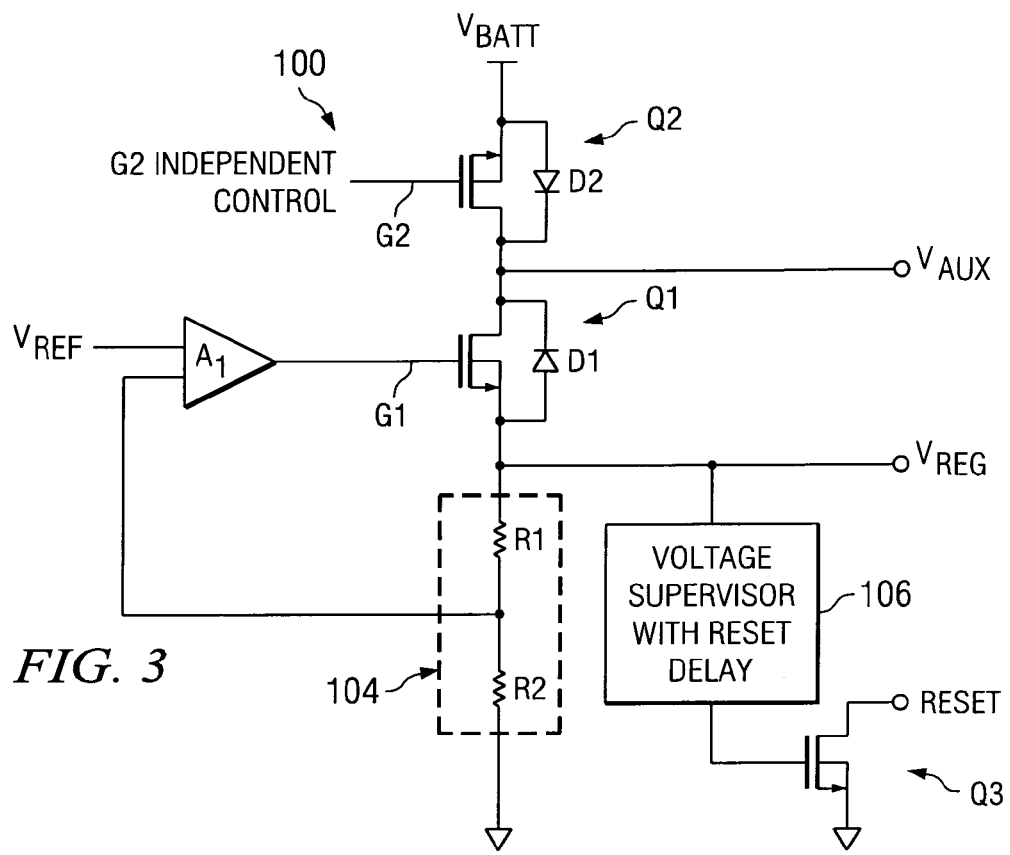
FIG. 3 displays the first mode of operation of the novel voltage regulator of FIG. 2 enabling the reverse battery protection feature.

In the first mode of operation, as shown in FIGS. 2 and 3, mode select switch $S_M$ selects node A, enabling transistor $Q_2$ to provide reverse battery protection. Mode select $S_M$ may be toggled a number of different ways including through a EEPROM or through a pin. When transistor $Q_2$ turns on it acts as a as a reverse blocking switch in the forward direction for transistor $Q_1$ and any other module connected to the auxiliary voltage node $V_{AUX}$. Further, in this mode, the output from the error amplifier $A_1$ controls both the gate $G_1$ of transistor $Q_1$. The voltage at the auxiliary voltage node $V_{AUX}$ is equivalent the voltage drop of one diode below the first power supply rail $V_{Batt}$. Ultimately, the output terminal $V_{Reg}$ for the voltage regulator 100 provides a regulated output.

Optionally, the design of voltage regulator 100 is made flexible such that transistor $Q_2$ must be eliminated and reverse blocking is not required, the first power supply $V_{Batt}$ can be fed directly through the auxiliary node $V_{AUX}$ such that voltage regulator 100 operates as a conventional regulator.

Figure 4:
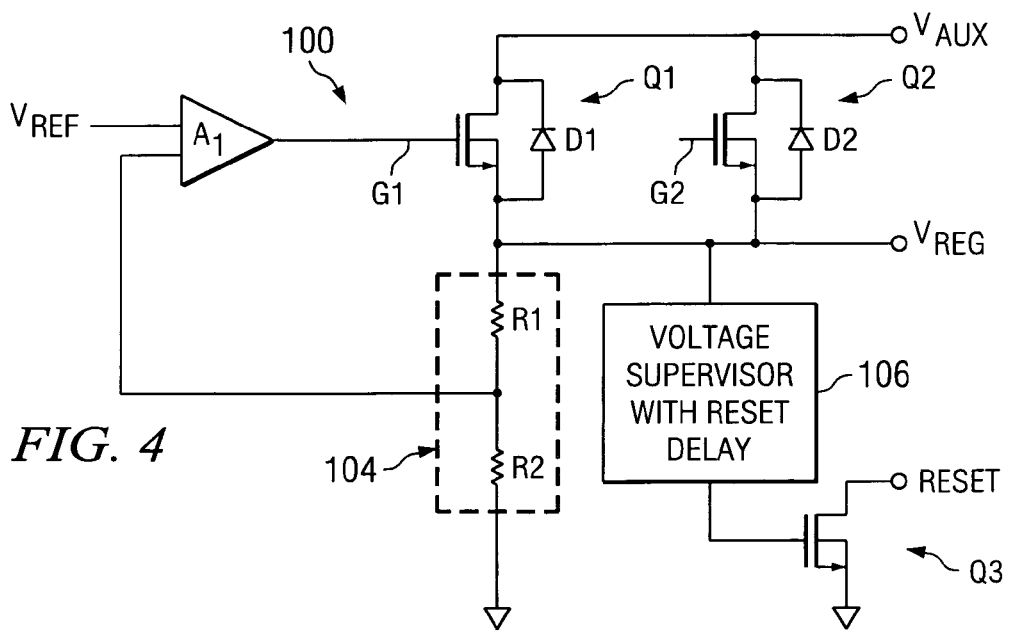
FIG. 4 shows the first mode of operation of the novel voltage regulator of FIG. 2 enabling the double power density feature.

Alternately, as is shown in FIGS. 2 and 4, during the second mode of operation, where the mode select switch $S_M$ selects node B, both transistors, $Q_1$ and $Q_2$ are on and are shorted together. Accordingly, the backgate diodes, $D_1$ and $D_2$ of transistors $Q_1$ and $Q_2$ are shorted together. As shown the output from the error amplifier $A_1$ in this mode controls both the gate $G_1$ of transistor $Q_1$ and the gate $G_2$ Of transistor $Q_2$. The first power supply rail $V_{Batt}$ is connected to the output terminal $V_{Reg}$ of the voltage regulator 100. Ultimately, the output terminal $V_{Reg}$ for the voltage regulator 100 provides a regulated output at twice the power density. In this mode of operation, mode select $S_M$ enables the preregulator 100 to have greater low-drop out capability by eliminating the reverse battery protection feature.

Figure 5:
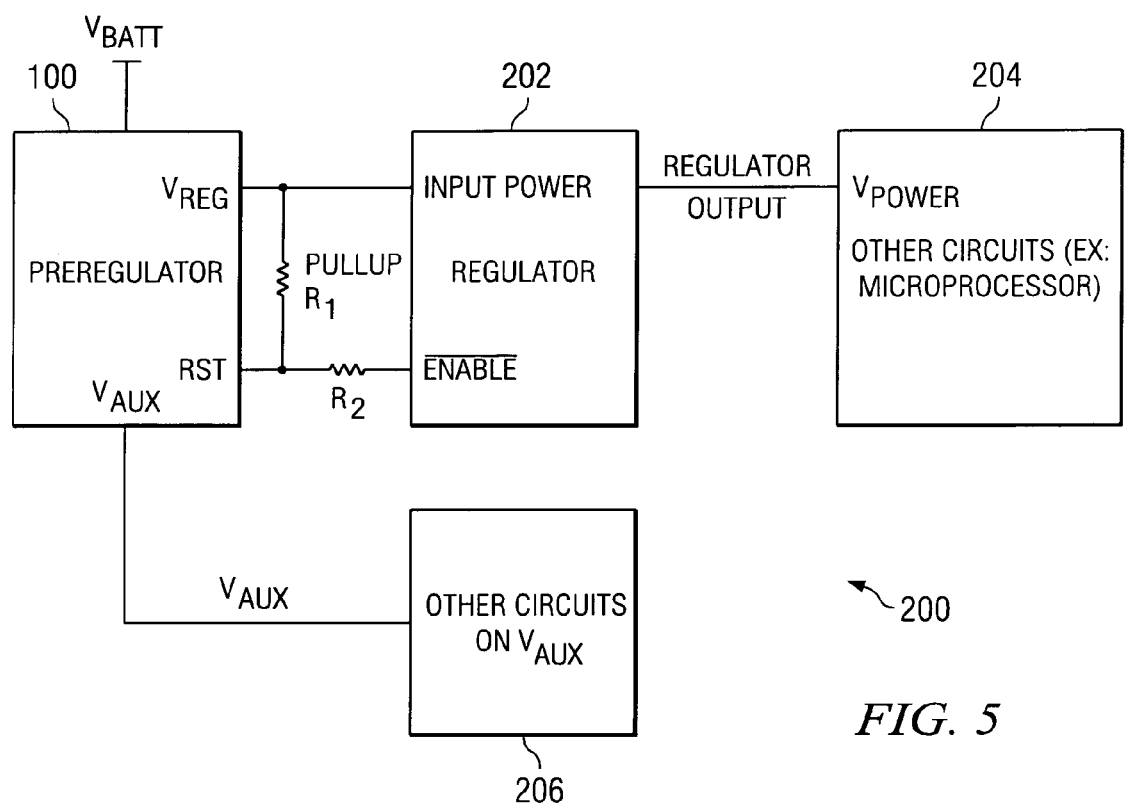
FIG. 5 shows a high level implementation for the voltage regulator in accordance with the present invention as a preregulator in a system.

A typical preregulator implementation with regulator 202 in a system 200 is shown in FIG. 5. Preregulator 100 provides high-voltage isolation to the regulator 202. Furthermore, preregulator 100 is operable to function in one of the two aforementioned configurable modes to provide voltage regulation with reverse blocking or voltage regulation having double the power density. This voltage regulator 100 was intended to be programmable and have a high voltage stand-off. Therein, the output terminal $V_{Reg}$ of the voltage regulator 100 may be programmed to a desired voltage which can additionally drive a second regulator that is not a high voltage standoff regulator. Moreover, his high voltage regulator 100 may provide power for a low voltage device or any combination of components, including but not limited to a low voltage regulator or a low voltage ASIC. Therefore, the voltage regulator 100 in accordance with the present invention represents a general purpose regulated power supply having high voltage stand-off and reverse battery protection.

Specifically, as shown, the reset pin RESET is tied to the enable node ENABLE of the regulator 202 to make sure that the preregulator 100 is stable before the regulator 102 is enabled. For example, in the case where 12V must be reached at the output terminal $V_{Reg}$ before the regulator 102 is turned on, a predetermined voltage of 12V must be reached before the reset pin RESET is pulled down. As shown other circuits 204 that operate at different voltages may receive voltage from the output of regulator 202. Moreover, other circuits 206 may connected to the auxiliary node $V_{AUX}$ that can handle a high voltage and need reverse battery protection.

Accordingly, regulator 100 can be used as a preregulator in low power low drop out mode for devices where voltage transients exist. Furthermore, this voltage regulator 100 can be used in a multi-chip module ASIC or separately within a system to protect the other circuitry from high voltage transients. For example, a regulator 202 needing a 5V input for operation and having a maximum voltage of 7V may couple to preregulator 100 such that the output is limited to 7V when the input voltage the preregulator 100 is 40V.

The advantages of the novel design for the voltage regulator shown in FIG. 2 includes but is not limited to a voltage regulator that provides a flexible solution that may be implemented in different high-voltage, high-performance applications. This voltage regulator is operable in two modes to optionally provide reverse battery protection or double power density. This voltage regulator, when implemented as a preregulator, provides high-voltage isolation to any regulator connected thereto. Moreover, when the voltage regulator is implemented as a preregulator, it may be connected to regulators that include low breakdown components. The reset node of the voltage regulator provides a means for an integrated self-turning enable output that can turn on a regulator and other modules when a predetermined voltage level is sustained.

While the principles of the present invention have been demonstrated with particular regard to the structures and methods disclosed herein, it will be recognized that various departures may be undertaken in the practice of the invention. The scope of the invention is not intended to be limited to the particular structures and methods disclosed herein, but should instead be gauged by the breadth of the claims that follow.

Those of skill in the art will recognize that the physical location of the elements illustrated in FIGS. 2, 3, 4 and 5 can be moved or relocated while retaining the function described above.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A low drop out linear voltage regulator, a first and a second power supply, comprising:
   an error amplifier having a first input coupled to receive a reference voltage, a second input and an output terminal;
   a first NMOS pass transistor having a source connected to an output terminal of the voltage regulator, a drain coupled to an auxiliary voltage input node, and a gate coupled to the output terminal of the error amplifier;
   a second NMOS pass transistor having a source connected to the first power supply, a drain coupled to an auxiliary voltage input node, and a gate;
   an control circuit having a mode select input, a first control signal input, a second control signal input, and an output coupled to the gate of the second NMOS pass transistor, wherein, in a first mode of operation, the first control signal input operable to receive an independent control signal for controlling the second NMOS pass transistor during reverse battery condition, and in a second mode of operation, the second control signal input operable to couple to the output terminal of the error amplifier and the first power supply rail operable to couple to the output terminal of the voltage regulator;
   a feedback network coupled between the source of the first NMOS pass transistor and the second input of the error amplifier;
   a voltage supervisor circuit having a reset delay coupled to the output terminal of the voltage regulator, wherein the voltage supervisor circuit being effective to render the voltage regulator non-operational in the event of the voltage supplied by the first NMOS pass transistor falling below a predetermined level; and
   a third NMOS pass transistor coupled between a reset node and the second power supply rail, the third NMOS pass transistor biased by the voltage supervisor circuit.

2. A voltage regulator as recited in claim 1, wherein the feedback network is a voltage divider connected between the output terminal of the voltage regulator and an input of the error amplifier, the voltage divider coupled in a feedback loop to the input of the error amplifier.

3. A voltage regulator as recited in claim 2, wherein the voltage divider includes a first resistor coupled between the output terminal of the voltage regulator and the second input of the error amplifier and a second resistor couples between the first resistor and the second power supply rail.

4. A voltage regulator as recited in claim 1, wherein the first NMOS pass transistor is a NMOS power transistor having an extended drain.

5. A voltage regulator as recited in claim 1, wherein the second NMOS pass transistor is a NMOS power transistor having an extended drain.

* * * * *